(12) United States Patent
Krichevski et al.

(10) Patent No.: US 6,944,670 B2
(45) Date of Patent: Sep. 13, 2005

(54) METHOD AND APPARATUS FOR MULTIPLE PROCESSING OF A PLURALITY OF COMMUNICATION PROTOCOLS ON A SINGLE PROCESSING MACHINE

(75) Inventors: Boris Krichevski, Jerusalem (IL); Yuli BarCohen, North Judea (IL); Marina Popilov, Elqana (IL); Iulian David, Hod Hasharon (IL)

(73) Assignee: Commatch Ltd., Rosh Ha'Ayin (IL)

( * ) Notice: Subject to any disclaimer, the term of this patent is extended or adjusted under 35 U.S.C. 154(b) by 648 days.

(21) Appl. No.: 10/096,413

(22) Filed: Mar. 13, 2002

(65) Prior Publication Data

US 2003/0177252 A1 Sep. 18, 2003

(51) Int. Cl.[7] .............................................. G06F 15/16
(52) U.S. Cl. ...................... 709/230; 709/200; 709/201; 370/395.5; 370/467
(58) Field of Search ................................. 709/200–201, 709/230, 238; 370/395.5, 469

(56) References Cited

U.S. PATENT DOCUMENTS 6,356,951 B1 * 3/2002 Gentry, Jr. .................. 709/250
6,591,302 B2 * 7/2003 Boucher et al. ............. 709/230

* cited by examiner

Primary Examiner—Jack B. Harvey
Assistant Examiner—Hieu Le
(74) Attorney, Agent, or Firm—Mark M. Friedman

(57) ABSTRACT

An apparatus and method that can enable multi-protocol data processing at a single point in a data network. The apparatus includes a logic state machine that is capable of performing a variety of pre-defined actions for a plurality of communication protocols. The present data processing solution enables wire speed data processing, utilizing minimal instruction memory, because all the data resources required to process multiple protocols are stored on state machine tables, in the data memory. According to the data processing methodology, incoming packet headers are parsed for session ID, protocol ID and events ID per protocol. A relevant session history block is then found by a General State Machine Handler, according to the protocol ID, and the current state of each protocol is extracted. Subsequently, the relevant State Machine Table is found, according to the protocol ID, wherein a list of actions is described. These actions are then executed, according to the rules defined in an Action Handler Library, by the General State Machine Handler.

15 Claims, 2 Drawing Sheets

METHOD AND APPARATUS FOR MULTIPLE PROCESSING OF A PLURALITY OF COMMUNICATION PROTOCOLS ON A SINGLE PROCESSING MACHINE

FIELD AND BACKGROUND OF THE INVENTION

1. Field of the Invention

The present invention relates to a method and an apparatus for improving data processing in data networks. More particularly, the present invention enables wire-speed multi-protocol data processing using a single machine at a single point in the network.

2. Description of the Related Art

Computer networks necessitate the provision of various communication protocols to transmit and receive data between the network elements. The enormous expansion in computer based data communications has resulted in a growing number of communications protocols that are used for enabling the various types and forms of communication. When a plurality of processors are connected to form a network for exchanging data, a set of procedural rules are set forth as the communication protocols. Every networked processing entity must follow this set of procedural rules, i.e., the protocol, which serves as the common language between these processors for communication with each other.

There are no known current technologies on the market that enable a simple and cost effective means for narrowing of the gap between the multi-Gigabit speeds of modern data transmission and the multi-Megabit speed of modem data processors, thereby allowing standard processors to process incoming data packets at wire-speed. As a result, traditional multi-protocol processing apparatus in unable to achieve processing speed of data packets that compares to the speed of the data packet transfers. Consequently the substantial improvements in communications infrastructures go largely unfelt, as the data is still typically processed at slower speeds. Each network device typically contains a combination of hardware and software that translate protocols and enable processing of data. For example, the subject medium of a communication may be voice, data, video, multi-media or facsimile, and such a communication may be received or transmitted by digital telephones, analog telephones, cellular telephones, computers, facsimile machines, etc. One drawback to the dramatic telecommunication advances is that the different protocols used are not naturally compatible with each other.

There are two current competitive technologies that attempt to improve networking that supports cross protocol communications.

The first technology performs the real time critical processing on a series of regular computers (for example PC, Unix Work Station, Mainframe, etc.) in parallel. In this case, each computer runs the full general IP protocol stack, and special (typically proprietary) apparatus supports load balancing between the processors. The advantage of this technology type is that general processors and general software stacks are used. The disadvantage is that too many processors are needed to fill the substantial processing gap (100–1000 times), and the load balancing requirements become increasingly complicated. Examples of such systems are those such as Shasta by Nortel (http://www.nortelnetworks.com), and CoSine IP Service Delivery Platform by Cosine (http://www.cosinecom.com).

In this case the processing of additional protocols can be facilitated, since there is typically much instruction memory available. However, since the general Computer Stations s are relatively generic devices that are able to do multi-functions, they are generally considered to be too slow to be used for dedicated network processing.

The second technology that deals with solutions for this problem is based on processing some protocols on dedicated Application Specific Integrated Circuits (ASICs). ASIC chips are custom designed for a specific application rather than a general-purpose chip such as a microprocessor. The use of ASICs improves performance over general-purpose CPUs, because ASICs are "hardwired" to do a specific job and do not incur the overhead of fetching and interpreting stored instructions. The disadvantage of such technology is that the number of protocols is continually growing, and therefore ASICs are required to be updated in order to support any new protocols or any new features in existing protocols. Such adaptations require near full ASIC re-design cycles. A consequence is that the weight of each protocol in the whole scheme of communications traffic is regularly changed. Since such adaptations require additional programming, pure hardware implementation (ASIC) is impossible, or at least ineffective. Some kind of CPU core for actions is required, and the use of several chips (general purpose CPU+ASIC) poses serious synchronization problems. A further problem with pure-hardware implementations is that even though implementation of protocols, such as TCP/IP in ASIC can be executed, it is almost impossible to do it bug free, and bug fixing in ASIC is extremely difficult.

Examples of such systems are the Nexsi 8000 Content Services System by Nexsi Systems (http://www.nexsi.com/), and the Celox SCx 192 by Celox (http://www.celoxnetworks.com/).

U.S. Pat. No. 6,034,963 describes a hardware-integrated system that both decodes multiple network protocols in a byte-streaming manner concurrently and processes packet data in one pass, thereby reducing system memory and form factor requirements, while also eliminating software CPU overhead. The '963 patent explicitly mentions displaying received data on different screens, i.e. it describes mainly interactive systems. The '963 patent is about TCP/IP support in silicone, and offers nothing for upper layers' protocols acceleration. This solution, therefore, is along the lines of the ASIC model, which is inflexible with regard to adaptation to new protocols.

Recent technological progress has introduced to the communications market a new kind of computer communications device, generally known as Network Processors (NP). Network Processor merge the advantages of both of the above-mentioned solutions, by typically including several dedicated processors with embedded parallel processing support, and software configurable look up accelerator support.

A Network Processor is therefore programmable, in contrast with ASICs, and it is furthermore designed for parallel processing, in contrast with general processors. In addition, NP provides specialized hardware accelerators, in contrast with general processors.

NP was originally developed to speed the processing of low-level network features like QoS, MPLS, Ipv6 and VLAN. NP, for example, bridges the hardware gap in wire speed processing. However, there are various software problems, associated with the NP. Since NP's architecture is very different from that of conventional processors, conventional programming methods do not allow for effective utilization of NP resources. Such a weakness typically prohibits NPs from effectively processing higher layers protocols, which were traditionally typically processed by software only. An additional Network Processor restriction is the limited instruction memory in NPs, which prohibits implementation of high-level network features.

Conventional protocol processing requires of a network programmer to describe in terms of some programming language three main items: data extraction rules ("take two bytes at offset 7"), data analysis rules ("check if the value of those bytes is 1234"), and action items ("if yes, turn on the red LED"). Each network protocol is a long chain of items such as the above, which is specific to a particular protocol. Such an approach, however, has the following disadvantages: a larger quantity of instruction memory is consumed; parallel processing is limited because the instructions must be executed in order, one at a time (unless there are a plurality of CPU cores); algorithm implementation effectiveness depends first and foremost on the programmer's skills; and hardware acceleration is almost impossible (except using more powerful processors) because no hardware can compensate for the lack of programming skills.

Network devices are typically setup using hardware to handle the Link Layer protocol, and software to handle the Network, Transport, and Communication Protocols, as well as information data handling. The network device normally implements the one Link Layer protocol in hardware, limiting the attached computer to only that particular LAN protocol. The higher protocols, e.g. Network, Transport, and Communication protocols, along with the Data handlers, are implemented as software programs which process the data once the data passes through the network device hardware into the system memory. However, for each additional protocol, the network device requires substantially more program memory resources in order to be processed. Therefore, dedicated network processing devices are often used to execute specialized network processing. These network processors are typically restricted to minimal processing memory and significant quantities of data memory, in order to rapidly execute specific tasks.

The disadvantage of this implementation, however, is that if processing of additional protocols is required, the system requires a high processor overhead, a large amount of program memory is required. In addition, the computer used to coordinate such processing of different software protocols and data handlers demands a complicated configuration setup. During normal operation, once the hardware verifies the transport or link layer protocol, the resulting data packet is sent to a software layer which determines the packets frame format and strips any specific frame headers. The packet is then sent to different protocol stacks where it is evaluated for the specific protocol. However, the packet may be sent to several protocols stacks before it is accepted or rejected. The time lag created by software protocol stacks prevent audio and video transmissions to be processed in real-time, and therefore typically require the data to be buffered before playback.

In order to deal with the processing power limitations of such cross-processing devices, and properly follow the communication protocol for setting up a communication session between two processors in a network, each of the communication protocols are often represented as a 'finite state' machine, being designed with the operational states required to solve specific problems. The operational states of these protocols are cataloged as 'state tables', wherein, depending on the operation conditions of each of the processors being used, each processor is identified as being in a specific state.

Most of the protocols typically used are stateful protocols, wherein data is parsed with reference to previous processing stages. There are a limited number of stateless protocols (parsing without reference to previous processing stages) that can be presented like stateful protocols, yet this can only be typically achieved with a single state, alternatively referred to as 'one-state stateful protocols'. Examples of such a stateless protocols are IP as Layer 3 protocol, UDP on Layer 4, HTTP for WWW, SIP in VoIP protocol family etc.

Furthermore, existing protocols are often changed or become obsolete, while new protocols are created nearly every day. Each protocol is defined by its own specification, and is typically presented by the protocol specific state machines. The number of protocols in use makes it difficult to maintain wire-speed high level (protocol specific) processing of communication traffic, because nearly all protocols may be implemented in general processor based, low speed machines.

There is thus a widely recognized need for, and it would be highly advantageous to have, a generic way to simultaneously process a number of stateful protocols that belong to a same communication area (IP, voice decoding, VoATM, etc.) on a single high speed active component (machine), where this processing is enabled by software enhancements (at the micro-code or programming logic levels), and not by substantial hardware enhancements.

SUMMARY OF THE INVENTION

According to the present invention there is provided a method and apparatus that provide multi layer packet processing at a single point (using a single processing chip), so as to enable improved data processing in data networks. In addition, the present invention enables the performance of value added services such as actions to validate incoming data, gather statistics, run user-defined applications, etc.

The present invention includes a logic state machine that is capable of performing at one single point in an apparatus, a variety of pre-defined actions on a variety of different protocols. For example, requests in protocols such as HTTP, FTP, RTSP, Telnet and other IP Protocols, and other voice signaling protocols may be processed at one point, using one processor or machine. This machine uses predefined, protocol dependent data structures while performing the analysis and data processing following a unified, generic set of pre-programmed actions.

The Acceleration, according to the present invention, allows data to be processed at speeds compatible with existing data network infrastructures. Typical acceleration factors range from 100 to 1000, but are not limited to these.

The present invention significantly reduces time latencies introduced by current applications and packet processing techniques. Such latencies are typical and highly notable in firewalls, Denial of Service (DoS) and Intrusion Detection applications. This new processing concept allows speeding up such applications so that latencies in existing infrastructures are negligible, and less equipment and data-processing power are required.

The following definitions are utilized within the scope of the present document:

Protocol: A special set of rules that end points in telecommunication use when they communicate. Both end points must recognize and observe the protocol in order to effectively communicate. Protocols are often described in industrial or international standards.

State: The current or last-known status, or condition, of a process.

Finite State Machine: In general a state machine is any device that stores the status of something at a given time, and can operate on input to change the status and/or cause an action or output to take place for any given change.

Event: An action initiated either by the user or the computer.

Session: A series of interactions that occur between two communication end points during the span of single connection.

The apparatus according to the present invention typically comprises the following basic components:
 i. an Ingress gate with an Ingress rules set;
 ii. a packet parser mechanism;
 iii. General State Machine Handler;
 iv. a series of session history blocks (tables);
 v. a series of protocol stateful tables;
 vi. Action Handlers Library;
 vii. an Egress gate with an Egress rules set.

According to the central methodology of the present invention, incoming packets are processed by an Ingress Gate according to primary Ingress rules. Packets are subsequently parsed for session ID, events ID and protocol ID information. Results of the above parsing are used by a general state machine handler (GSMH), which executes actions according to the relevant protocol specifications of the incoming data. The GSMH refers to a relevant session history block in order to determine the state of a particular protocol, and subsequently looks up the protocol events and states on a relevant Protocol Stateful Table (PST), in order to determine what path of action to execute. A list of actions required to execute the determined path of action is then called from an Action Handler Library.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
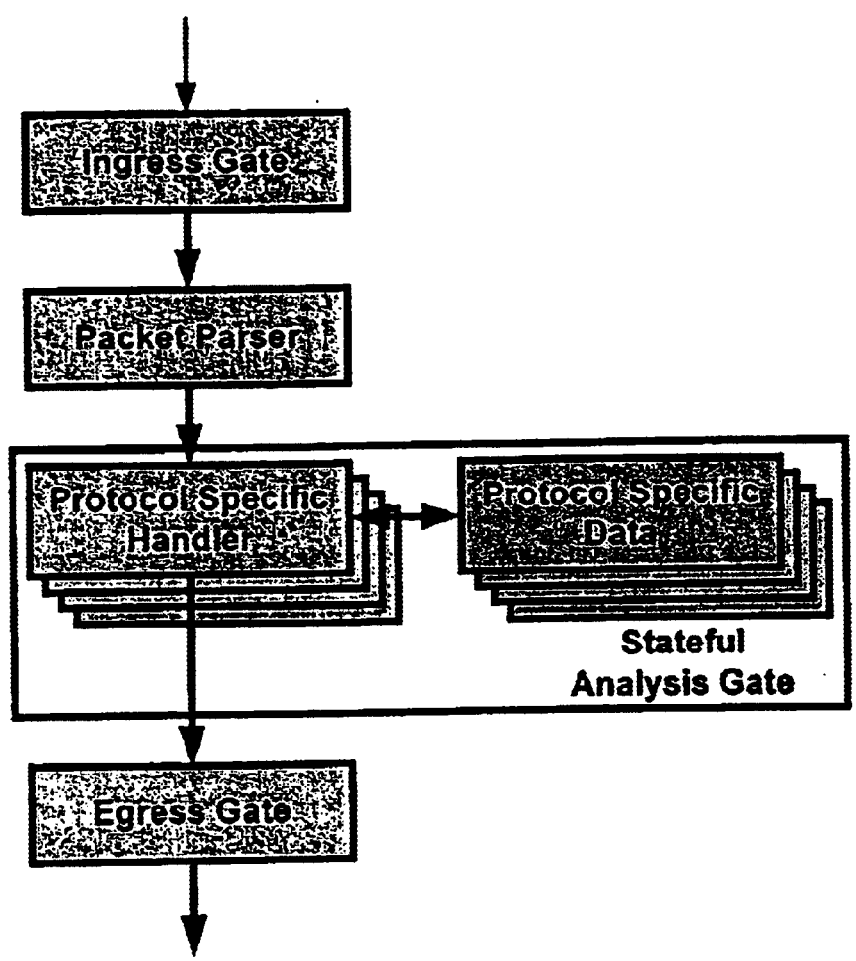
FIG. 1 is an illustration of the typical layer-based data processing process.

The present invention relates to a generic way to simultaneously process a number of stateful protocols on a single high-speed active component (machine). The present invention furthermore provides an apparatus for enabling multi-protocol processing with limited processing resources and a limited number of instructions.

The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Specifically, the present invention can be used to provide a method that enables adding protocol independent processing to a list of areas where modern high-speed active components (such as a Network Processor, DSP, FPGA or ASIC) are used for traffic processing. The apparatus of the present invention supports an "unlimited" (the limit is data memory storage size) number of stateful protocols using minimal executable memory storage implemented as single-point entry. This apparatus can be used to process any kind of communication protocol on any network (packet or circuit). The apparatus can be applied to any portion of information passed in a network (cell, packet, message), and the apparatus can recognize fragments of information in separate packets events. The apparatus, furthermore, is transparent for "ongoing communication" (it does not change during the flow of a session). The critical methodology that is executed in the network processors (or equivalent), according to the present invention, enable extremely effective, high-speed data processing in data networks. Such high-speed performance is a function of shortened instruction memory that prohibits any multi-protocol processing without usage of a particular algorithm, according to the present invention.

The present invention integrates networking hardware mechanisms to accelerate well-defined primitive operations like table look-ups, simple pattern matching, etc. There are effective hardware classifiers that combine data extraction and data analysis, i.e. they can check a byte sequence against some patterns. If, for example, there is a need to check 3rd, 6th, and 9th bytes of the packet, hardware classifiers do all the checks at once and do not require additional (instruction) memory. Moreover, such hardware can process the above in parallel, with saving the packet in buffer memory, while the conventional program reads the data from the buffer, i.e. must do it after the packet has been saved.

There is currently available table look-up hardware that is highly effective for this purpose. The three main classes of specialized look-up hardware are:
 i. Search engines (in fact, ternary CAMs) by such companies as Lara, Mosaid, NetLogic, and others. See:
 a. Lara Networks (now Cypress Semiconductors) at http://www.cypress.com. Go to:
   Products->Network Search Engines->Network Search Engine (NSE):
   CYNSE70032-83BGC; CYNSE70064-83BGC; CYNSE70128-100BGC.
 b. MOSAID Technologies, Inc.
 c. NetLogic Microsystems.
 ii. Classification co-processors like PMC-Sierra ClassiPI, FastChip, Solidum. See:
 a. PMC-Sierra, Inc.
 b. FastChip, Inc.
 c. Solidum, http://www.solidum.com/products/1100.cfm.
 iii. On-chip accelerators of some network processors like IBM's PowerNP hardware classifier and tree search engine. See:
 a. IBM
 b. Vitesse Semiconductor Corporation The variety of effective table look-up hardware explains why using tables at every possible place results in dramatic speed improvements (of course, at the expense of data memory which is consumed a lot more than in conventional programming). The present invention integrates table-driven state machines that are used to implement some actions (such as, "if the value is 1234, move to step 4") as table accesses on dedicated hardware, thereby resulting in obvious speed benefits. Of course, most of the actions ("turn on red LED") must be programmed in a more or less conventional way, but some primitive operations may be off-loaded to dedicated hardware (such as a string copying co-processor).

The present invention combines the best features of two worlds: hardware speed and software flexibility. It thereby eliminates the problems associated with ASIC, such as long development cycle and lack of flexibility, without performance penalties of software implementation.

The principles and operation of the apparatus and method according to the present invention may be better understood with reference to the drawings and the accompanying description, it being understood that these drawings are given for illustrative purposes only and are not meant to be limiting, wherein:

Typical implementation of multi-protocol processors are layer implementations, as can be seen in FIG. 1. According to such an implementation, data packets comprised of multiple protocols enter the network-processing device through the Ingress Gate 11 (entrance gate, whereby typical initial processing of data events occurs), and are subsequently parsed by the packet parser 12. Independent processing blocks 13 are required to be created for each protocol on each processing level. TCP/IP stacks, for example, provide each component as an independent object with a protocol specific handler 13, which includes both protocol program and data 14. When processing data across multi-protocols, each component processes the data received at that level only. It is clear, therefore, that each protocol that is required to be processed requires its own processing block and handler. The data packet thus processed is further instructed at the Egress Gate 15 (exiting gate, whereby typical final processing of data events occurs).

The above scheme, however, creates a lot of code (instructions) for each protocol. This is because of the large number of instructions that are required to compose a path of action to the Protocol Specific Handler 13, and the number of Handlers for protocol specific Actions. The quantity of data stored, however, is relatively small. The stored data is comprised of predominantly the data that is important for the general processor. The software code implemented for data searching, however, is expensive in terms of development time. Furthermore the data search algorithms (for large data sources) are complicated and include a lot of loops in order to compare search keys with the data itself. The data store is updated frequently, yet the search algorithms and implementations are relatively stable.

The regular model described above is not suitable for Network Processors and Programming Logic implementations because:

It requires a lot of instruction memory, which a typical Network Processor does not have.

It does not utilize one of the most serious Network Processor features—very fast hardware for accelerated table lookup.

In contrast, the implementation according to the present invention allows for increasingly efficient Network Processor resources utilization. The present invention provides an implementation that makes use of the specific benefits that Network Processors provide, such as lookup hardware accelerators, hardware comparators, hardware data classifiers, etc. The present invention proposes a data processing model based on a Multi Protocol processing system. This model utilizes a combination of General State Machine Handlers, Protocol Stateful Tables and Session History Tables in order to simultaneously process incoming data expressed by a plurality of protocols. For example, a typical data request sent over an Internet network will be in the form of a data packet that includes an HTTP component, a TCP component, and an IP component. Each of these components, according to the present invention, is separately (yet simultaneously) processed, according to the rules associated with each particular protocol. This model thereby allows efficient processing of multi-protocols at a single point, while maintaining minimal instruction memory, since all protocol dependant information required to execute multiple protocols is stored on state machine tables, within the data memory.

Figure 2:
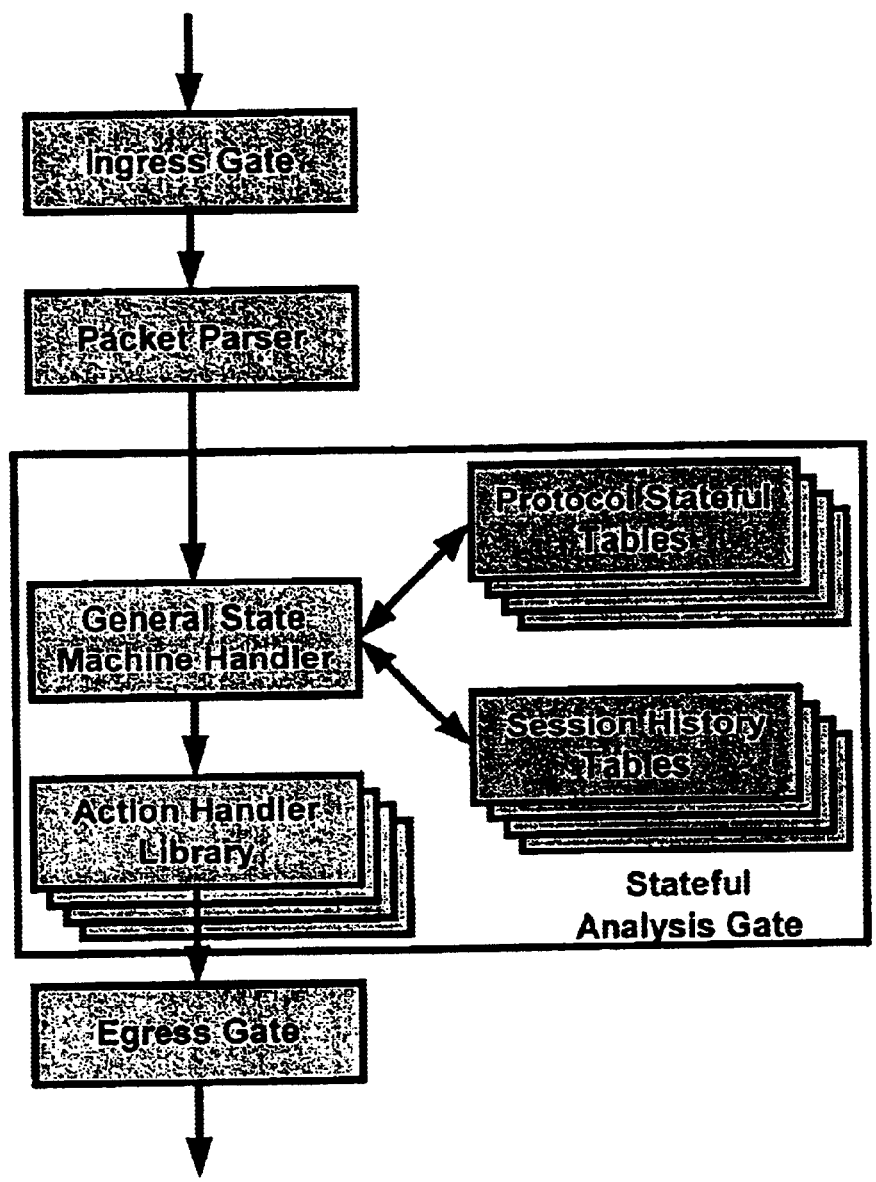
FIG. 2 is an illustration of the apparatus in a typical state machine data processing model, according to the present invention.

The present invention apparatus consists of a computing communication device, such as a network processor, with both hardware and software components. The device is connected to a network, and enabled to receive or transfer packets in a variety of communication protocols. The primary components of the present invention, as can be seen in FIG. 2, are as follows:

i. An Ingress gate 21, for pre-processing of incoming packets according to a typical incoming (Ingress) packet processing rules set. For example, rules determining Destination IP addresses, and to find the output port according to a relevant Routing;

ii. A packet parser mechanism 22, for analyzing incoming packets containing multi-protocol data. The parser enables identification and extraction of session identity (ID), protocol ID for each protocol, and events ID per protocol. This is in order to establish the relevant protocols being communicated by the specific packet, as well as the current state of each protocol in a given session. The parser mechanism functions as an Input Packet Analyzer, wherein events are identified and extracted. An event in a protocol is a trigger to execute a set of pre-defined actions;

iii. A General State Machine Handler (GSMH) 23, executing actions according to the actions defined in the protocol stateful tables. The GSMH retrieves the current state of each protocol from the session history table, according to session ID. The GSMH then queries the relevant protocol stateful tables according to the protocol ID, event ID and protocol current state to determine the actions to be executed. The GSMH finally executes the appropriate action, called from the Action Handler Library.

iv. Protocol Stateful tables (PST) 24, for defining actions to be executed according to current protocol state and incoming event, for each particular protocol. A state of a protocol is a stable situation caused by previously occurred events. States are typically defined according to the RFC that is relevant to the particular protocol.

v. Session History Tables 25, for keeping track of events in a session, in order to determine the current state of each protocol at any time.

vi. Action Handler Library 26, for storing means to implement the protocol independent actions. The execution of these means is undertaken by the GSMH.

vii. An Egress Gate 27, for protocol-independent generic post-processing of packets. For example, for post-processing according to the relevant destination MAC addresses, following a typical outgoing (Egress) packet processing rules set.

The Process

The method of configuring the apparatus, according to the present invention, is divided into two stages: pre-configuration and processing.

Pre-Configuration Stage:

The pre-configuration stage requires analyzing of various relevant protocol definitions, typically from a Request For Comments (RFC) document, in order to derive a Protocol Stateful Tables (PST) for each protocol. RFCs are formal documents from the Internet Engineering Task Force (IETF), which describe the specifications for a recommended technology. These PSTs are created by using a spreadsheet-like tool to convert a protocol description to an internal data format. The data from the RFC's typically enable the classification of steady states, as well as assumed events data for each protocol. In addition, the PST table creation procedure enables the derivation of mid-states, where necessary. For example, in cases where the RFC does not define all asynchronous events explicitly, the numbers of stable instances ("states") may be greater than those described in the RFC. This typically causes the number of states in the present implementation to be roughly twice the number of states defined in the RFC. Every state (steady or transient) has explicitly defined unconditional behavior for all possible asynchronous events. For correct processing and error checking, transient states should also be defined, because transition from state to state takes non-zero time and may require an exchange of several messages. Examples of such events are protocol messages, hardware problems and timeouts.

The PST table is a 2-dimension table with "Current State" and "Assumed Event" entries for each protocol (as can be seen in the table below). Each crossed cage of these tables has a set of routines that should be called in a particular scenario. Routines are divided into general and protocol-specific. Most of the routines, once implemented, become re-usable for any protocol.
As a result, all PSTs are stored in the network device data memory as tables.
Processing Stage:

The processing stage, according to the packet-processing algorithm, is as follows:

1. A packet enters through the Ingress Gate 21 for generic pre-processing, and transferring to the packet parser.
2. The Packet Parser 22 is an Input Packet Analyzer wherein sessions, protocols and events per protocol are identified and extracted. This information is determined by applying particular templates, pre-defined for particular protocols. The identity of the protocol of an incoming packet may be absolute, which causes detection of a particular protocol, or relative, which causes a query of a list of suspected protocols, to match the suspected protocol with a pre-configured Protocol State Table. In the case of a relative protocol identity, according to a preferred implementation of the present invention, the hardware acceleration platform supplies a relative identity list, according to which all resulting Packets (messages) are inspected by all listed protocols, one-by-one until the end of the list. As a result of this step, a particular PST is chosen, in accordance with the protocol inspection results. If the packet does not belong to any known session, the Packet Parser analyses the packet for protocol type identification information. In case the packet belongs to non-supported protocols, it is defined as a non-recognized protocol. A special protocol is subsequently defined for the processing of those packets that utilize non-supported protocols. The Packet Parser furthermore adds absolute proprietary protocol identification to the packet, such as a tag that determines how to process the packet.
3. The packet arrives at the General State Machine Handler (GSMH) 23, in order to determine the appropriate set of actions for the incoming packet, and execute the actions. A state in a protocol is a stable situation caused by previously occurred events, and characterized by a particular scenario specific to the currently occurring event. States are typically defined according to the RFC that is relevant to the particular protocol. Even though the protocol states table is defined according to the RFC, the RFC typically describes only steady states. For correct processing and error checking, transient states should also be defined, because transition from state to state takes non-zero time and may require an exchange of several messages. In other words, the RFC typically describes only starting states and final states after the exchange complete. It is often also necessary to describe intermediate stages of the exchange. An intermediate stage is defined by a system designer/architect based on her/his knowledge and experience. This typically causes the number of states in the present implementation to be roughly twice the number of states defined in RFC.
4. The General State Machine handler (GSMH) searches the session history table, according to session ID, for every incoming packet. In the case where current state data is not available from a relevant session History Block, a new session is detected (no previous history for the session is determined) and the General State Machine handler (GSMH) creates a new Session History Block. This new session history entry is defined as being in an "idle" state.
5. The General State Machine handler (GSMH) subsequently looks up the relevant action to execute for the incoming packet, according to the previously determined events and states for all the relevant protocols, in the PSTs. All the above-mentioned protocols are handled by a single engine, forming a single-point universal protocol controller.
6. The action is executed according to the protocol independent rules set out in the Action Handler Library.
7. The packet leaves the system through the Egress Gate 27.

The Protocol Stateful Table Preparation

The Protocol Stateful Table, as illustrated in the following table, is a 2 dimensional table that includes rows for data states and Columns for Assumed Events.
Examples of Events (for HTTP) are:
  Connect Request,
  Delete Request,
  Get Request,
  Head Request,
  Link Request,
  Post Request,
  Put Request,
  Trace Request.
Examples of States (for HTTP) are:
  Wait for Request,
  Wait for Response,
  Wait for One Packet Response,
  Wait for Get Response,
  Wait for Connect Response Each crossed cage of the PST has a set of Action Handlers (routines) that should be called in particular scenarios. Routines are divided into general and protocol-defined. Most of the routines, once implemented, become re-usable for any protocol. As a result, protocol PSTs are stored in the data memory of the network device as tables.

The present invention utilizes a spreadsheet application for filling the table according to the protocol definition. Proprietary macro script translates the spreadsheet-type table into an internal data format that presents the Protocol Stateful Table. This internal data format is stored in, for example, the network processor data memory. Two examples of scripts that perform similar functions are:
1—The macro-script "FSM Excel table to c-code", which converts table information (written in Excel) to C code and C data structures. In this case, script is used to evaluate protocol implemented by the present apparatus in a native-C language designer environment.

2—The macro-script "FSM Excel Table to "hardware component" Data Memory", which converts table information to data storage format specific for a particular hardware (such as an IBM Network Processor, according the present implementation). Data storage, in this case, has a pre-defined format that is placed in particular Memory and has a predefined structure.

The above method is based on a table presentation of a stateful protocol, as follows:

|  | State 1 | State 2 | ... | State N-1 | State N |
|---|---|---|---|---|---|
| Event 1 | Action 1.1.1 | Action 1.2.1 |  | Action 1.N-1.1 | Action 1.N.1 |
|  | Action 1.1.2 | Action 1.2.2 |  | Action 1.N-1.2 | Action 1.N.2 |
|  | ... | ... |  | ... | ... |
|  | Action 1.1.K | Action 1.2.K |  | Action 1.N-1.K | Action 1.N.K |
| Event 2 | Action 2.1.1 | Action 2.2.1 |  | Action 2.N-1.1 | Action 2.N.1 |
|  | Action 2.1.2 | Action 2.2.2 |  | Action 2.N-1.2 | Action 2.N.2 |
|  | ... | ... |  | ... | ... |
|  | Action 2.1.K | Action 2.2.K |  | Action 2.N-1.K | Action 2.N.K |
| ... |  |  |  |  |  |
| Event M | Action M.1.1 | Action M.2.1 |  | Action M.N-1.1 | Action M.N.1 |
|  | Action M.1.2 | Action M.2.2 |  | Action M.N-1.2 | Action M.N.2 |
|  | ... | ... |  | ... | ... |
|  | Action M.1.K | Action M.2.K |  | Action M.N-1.K | Action M.N.K |

As can be seen in the above table example, an independent table is provided for each protocol presented. Such tables are stored in a processor's data memory, and make relatively light use of the system memory resources. Since the same actions are relevant for different protocols, the total number of active components required to process these protocols is drastically reduced. This is in contrast to the total number of active components typically required when individual and separate protocol implementation is carried out.

Alternate Embodiments

Several other embodiments are contemplated by the inventors.

According to an additional embodiment of the present invention, in the case where the apparatus serves more then one user or more then one user per protocol, an addition data structure, a Session History Block, is added in order to store the Protocol State Machine current snapshot per user specific session. This enables handling of incoming data requests on a per user basis, according to the individual user profile. For example, a different action may be executed per user, even if the protocol, state and event are identical.

An additional embodiment of the present invention provides for a generic state machine that is designed in such a way that common software architecture can:

accept new rules following which existing and/or new protocols can be processed represent the highest (or close to) content or number of functions common to all protocols and actions to be performed on their respective packets.

share intermediate computational results between the different functions to be performed. This sharing of results eliminates multiple performance of similar/same routines (sub-functions) by different functions. When a routine is first called by any function, the result is stored and supplied to other functions. These responses to routine calls are immediate, nor requiring calling of the actual routines.

receive rule changes as they become available and use them immediately upon the next processing cycle.

As a result, multiple actions on different protocols can be simultaneously performed, thereby accelerating processing by the factors described above.

The foregoing description of the embodiments of the invention has been presented for the purposes of illustration and description. It is not intended to be exhaustive or to limit the invention to the precise form disclosed. It should be appreciated that many modifications and variations are possible in light of the above teaching. It is intended that the scope of the invention be limited not by this detailed description, but rather by the claims appended hereto.

What is claimed is:

1. A method for enabling multi protocol data processing at a single point in a data network, comprising:

parsing incoming packet headers for session ID, protocol ID, and events ID per protocol ID, by a parser;

extracting current state data from a relevant session History Block, based on said session ID, by a General State Machine Handler (GSMH);

looking up an action to execute for said packet, said action being described in a Protocol Stateful Table (PST) according to said protocol ID, by said GSMH; and executing said action, according to rules described by an Action Handler Library, by said GSMH.

2. The method of claim 1, wherein in the case where said protocol ID is relative:

querying a list of suspected protocols, to match said relative protocol ID with a listed protocol;

detecting said relative protocol ID from said list, by inspecting said relative protocol ID by said listed protocols; and choosing a PST, according to results of said inspection.

3. The method of claim 1, wherein in the case where said protocol ID is a non-recognized protocol:

defining a special protocol for processing of packets that utilize non-supported protocols; and adding an absolute proprietary protocol identification to said packets.

4. The method of claim 1, wherein in the case where said current state data is not available from said relevant session History Block:

determining that a new session is in process;

creating a new Session History Block; and defining said new Session History Block as "idle".

5. The method of claim 6, wherein said GSMH enables generally available hardware to implement wire speed protocol processing, said processing being enabled for protocols at all OSI layers.

6. The method of claim 1, wherein said GSMH enables optimization of network processor resources, to achieve wire speed performance levels using typical network processor resources.

7. The method of claim 1, wherein said rules described by said Action Handler Library are changed, said changes being available upon the next processing cycle.

8. The method of claim 1, further comprising a pre-configuration stage, wherein protocol definitions are analyzed to create said Protocol Stateful tables (PST), for each protocol.

9. The method of claim 8, wherein said protocol definitions are taken from a protocol's RFC.

10. The method of claim 8, wherein said PST further comprises current state of protocol, assumed state of protocol and a set of routines to be called in a particular scenario.

11. An apparatus for enabling wire speed processing of a plurality of protocols at a single point in a data network, comprising:
- a Packet Parser for identifying and extracting identity (ID) data per protocol from an incoming multi-protocol data packet;
- a General State Machine Handler (GSMH) for executing actions in response to said packet, according to actions defined in a protocol stateful table;
- a Protocol Stateful Table (PST) for defining executable actions per state and event, for each protocol;
- a Session History Table, for determining current states of each protocol at any time; and
- an Action Handler Library for storing protocol independent action rules.

12. The system of claim 11, wherein said ID further comprises session ID, protocol ID, and event ID per said protocol ID.

13. The system of claim 11, wherein said PST further comprises steady state data and assumed event data per protocol, from said protocol's RFC.

14. The system of claim 13, further comprising transient-state data for each said protocol.

15. The system of claim 11, wherein said Session History Block further comprises a Protocol State Machine current snapshot per user specific session, for enabling handling instructions for incoming data per user.

* * * * *